(12) United States Patent
Zahir et al.

(10) Patent No.: US 8,560,236 B1
(45) Date of Patent: Oct. 15, 2013

(54) SHOWING UNCERTAINTY OF LOCATION

(75) Inventors: Asif Zahir, San Francisco, CA (US);
Daniel S. Rice, San Francisco, AZ (US)

(73) Assignee: Google Inc., Mountain View, CA (US)

( * ) Notice: Subject to any disclaimer, the term of this patent is extended or adjusted under 35 U.S.C. 154(b) by 1221 days.

(21) Appl. No.: 12/143,514

(22) Filed: Jun. 20, 2008

(51) Int. Cl.
G01C 21/00 (2006.01)
G01C 21/34 (2006.01)
G08G 1/123 (2006.01)

(52) U.S. Cl.
USPC .......................................... 701/533

(58) Field of Classification Search
None
See application file for complete search history.

(56) References Cited

U.S. PATENT DOCUMENTS 7,375,649 B2 * 5/2008 Gueziec .................... 340/905
7,457,304 B2 11/2008 Roh et al.
2007/0225912 A1 * 9/2007 Grush .......................... 701/213
2008/0132198 A1 6/2008 Dayar et al.
2008/0132248 A1 6/2008 Wahlstrom
2008/0214155 A1 * 9/2008 Ramer et al. ............. 455/414.1
2008/0214156 A1 * 9/2008 Ramer et al. ............. 455/414.1
2012/0095683 A1 4/2012 Andrews et al.

OTHER PUBLICATIONS

ASA Marine Environmental Newsletter, a publication of Applied Science Associates, Inc., Jan. 2005, 4 pages.

* cited by examiner

*Primary Examiner* — Paul Danneman
(74) *Attorney, Agent, or Firm* — Fish & Richardson P.C.

(57) ABSTRACT

The subject matter of this specification can be embodied in, among other things, a computer-implemented method that includes identifying one or more previous locations for a mobile electronic device; identifying a plurality of possible travel routes for the mobile electronic device; determining possible locations for the mobile electronic device along the possible travel routes based on determined travel speed information for areas near the previous locations; and providing information for one or more indications of the possible locations to a user.

22 Claims, 9 Drawing Sheets

SHOWING UNCERTAINTY OF LOCATION

TECHNICAL FIELD

This document describes systems and techniques for locating items, such as mobile communication devices belonging to individuals.

BACKGROUND

Location, location, location. Those are the three most important words in real estate, and they are key to many other endeavors also. For example, anyone who watches high-tech spy shows understands how important it is to know the location of the bad guys. Often, the bad guy is being tracked by satellite and ducks into a building or drives under an overpass before disappearing for good. In real life, police may wish to locate kidnapping victims, such as in an Amber Alert emergency. In less dire situations, someone may wish to find the location of an acquaintance, such as if the acquaintance is lost or if they intended to meet up with the acquaintance and the acquaintance is late.

SUMMARY

This document describes systems and techniques for locating people or other items. The systems and techniques, for example, may identify a last known location for a person by identifying a last reported location (and time) from a mobile device, such as a smartphone, that is associated with the person. Various other prior locations may also be identified, as may velocity information (e.g., by computing the time between two identified locations, "snapping" to a roadway that connects the locations, and computing a length along the roadway) to determine a likely heading and speed of the person. For example, law enforcement may use a GPS signal from a child's cell phone to locate a missing child. A map of roadways in the area around the last known location may then be consulted, and likely possible speeds along each roadway may be determined, such as by the type of roadway (e.g., highways may be assumed to involve 65 mph or under operation, while city streets may be assumed to involve 45 mph or under operation) and/or using real-time traffic speed data. Using the last known time and location, the velocity information, and the mapping and traffic information, a system may compute a zone in which the person may be located. Such a zone can be computed for a variety of scenarios, and an indicator of a likelihood that the person is in each area may also be provided. For example, zones may be computed for different possible driving speeds (e.g., below the speed limit, at the speed limit, and above the speed limit) and designators of likelihoods that the person is in each zone can be determined.

Other features may also be provided with the systems and techniques here. In some implementations, users can opt-in to affirmatively agree to the system, choosing who has access to location information. For example, in computing zones in which a person or other item (e.g., a stolen car) might be located, the system may take into account determined rules of human behavior. In one situation, a user may lose his own GPS connection while driving and want to determine his likely possible locations. For example, rules may be established for how often a driver turns left or right, or goes straight, when presented with an intersection. Also, rules may indicate that drivers in a neighborhood will trend toward a thoroughfare, such as a highway, so a model of such behavior may be consulted, in presenting to a user zones in which a person or other item may be expected to be found. Moreover, particular goals of a tracked person may be input, such as a likely destination for the person. In situations where law enforcement are tracking a missing child, the fact that a kidnapper may be a flight risk may also be input. Such goals may be incorporated into a computation of zones in which the person is likely to be found (e.g., a flight risk may be more likely to be found in a path heading toward an airport or an international border).

In a first general aspect, a computer-implemented method is described. The method can comprise identifying one or more previous locations for a mobile electronic device; identifying a plurality of possible travel routes for the mobile electronic device; determining possible locations for the mobile electronic device along the possible travel routes based on determined travel speed information for areas near the previous locations; and providing information for one or more indications of the possible locations to a user.

In a second general aspect, a computer-implemented method is described. The method includes an interface configured to receive location information indicating a last known location of a mobile device and a time of the location; map storage containing geographic information near the last known location; a route analyzer to determine one or more future possible locations of the mobile device using the last known location of the and the geographic information in the map storage; and a display generator for generating information for communicating, graphically or audibly, the one or more future possible locations of the mobile device.

In still another general aspect, a computer-implemented system is described. The system includes an interface configured to receive location information indicating a last known location of a mobile device and a time of the location; map storage containing geographic information near the last known location; a route analyzer to determine one or more future possible locations of the mobile device using the last known location of the and the geographic information in the map storage; and generating information for communicating, graphically or audibly, the one or more future possible locations of the mobile device.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
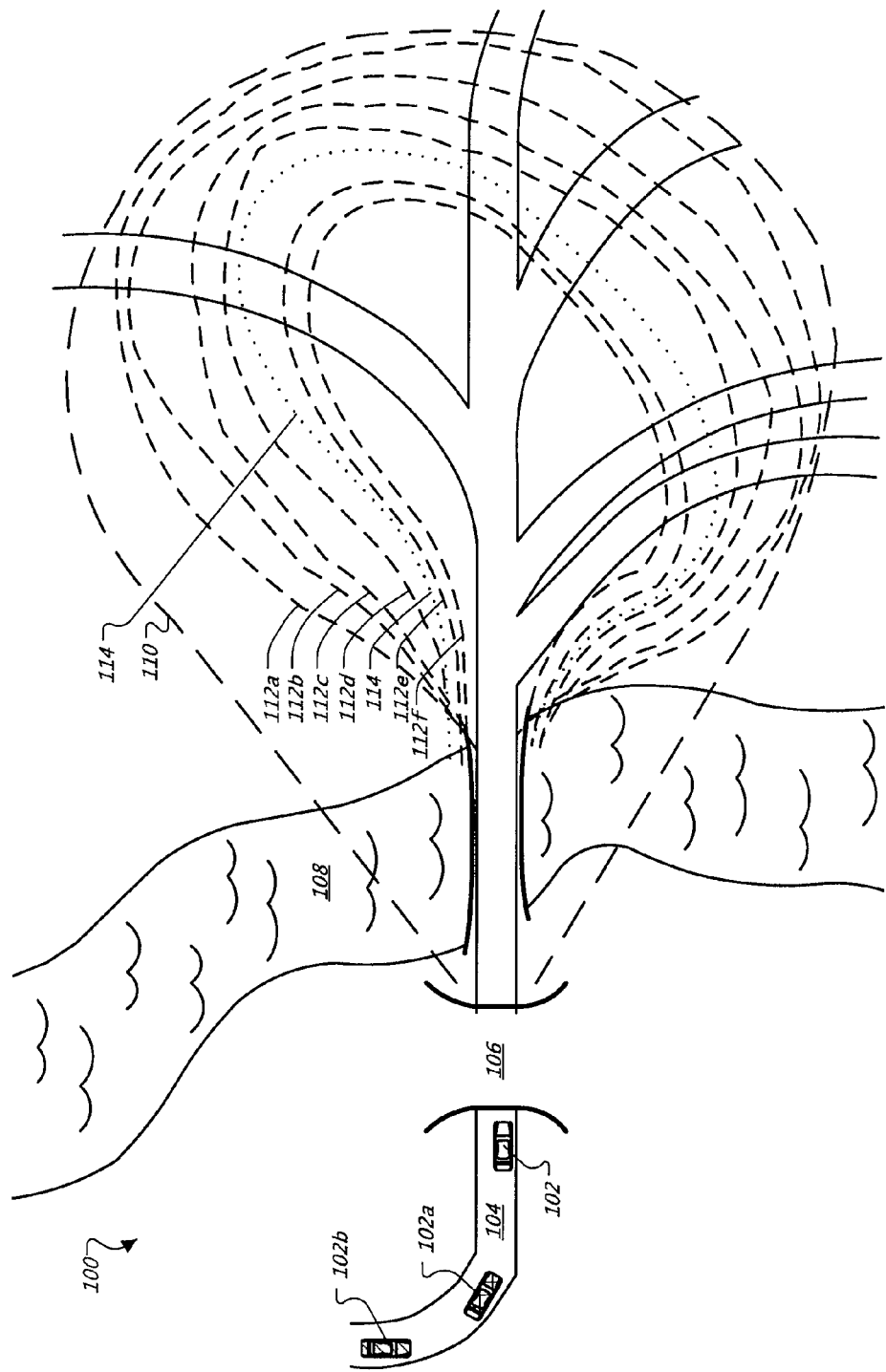
FIG. 1 is a conceptual diagram showing the prediction of the location of a mobile device in a geographic area.

FIG. 1 is a conceptual diagram showing the prediction of the location of a mobile device 102 in a geographic area. In general, a computer-implemented program may determine the most likely locations of an individual from the last known location that the mobile device 102, which is possessed by the individual, has provided. For example, law enforcement may use a GPS signal from a child's cell phone to locate the child. If the child were traveling in a car with the GPS cell phone and the car went through a tunnel or the device were shut off or ran out of battery power, the device may stop reporting its location. The child's likely location may be calculated and displayed, given the location and the time of the last transmission. In such situations, parents can provide access to the child's GPS cell phone information to law enforcement. Likewise, a user may lose his GPS connection while driving. The likely possible locations of the user can be displayed to him so that he can quickly determine his actual location. In a similar manner, a last known location for an item (e.g., a cellular telephone) may be located by other mechanisms, such as cellular telephone tower triangulation, WiFi and other access point positioning, and peer-to-peer location detection. In some implementations, users can opt-in to affirmatively agree to the system, choosing who has access to location information.

Referring to FIG. 1, the mobile device 102, shown graphically as a car representing the last known location of the mobile device 102. Previously known locations 102a-102b of the device 102 are shown in prior locations along a roadway 104. As shown in this example, the roadway 104 is I-294 in Pittsburgh, Pa. The device 102 has since disappeared, the signal being lost because the mobile device 102 has driven through a tunnel 106, shown here as the Fort Pitt Tunnel, and has not since reappeared.

In the figure, various areas are predetermined to be areas in which the device 102 could be located at some time after it disappears, or the time after its last known location (termed here a "zone of possibility" 110), and areas in which it would be very unlikely to be located (termed here "improbable areas" 108). For example, the roadway 104 passes through the tunnel 106 and across an improbable area 108, here shown as the Monongahela River—an improbable area because cars typically do not travel off of ordinary roadways.

In contrast, the zone of possibility 110 shows the possible locations of the mobile device 102. The zone of possibility 110 may be computed, as explained in more detail below, by determining all possible routes of travel in an area around the last known location and applying a maximum speed for the device 102 along each route, from the time of the last known location to the time at which the location of the device 102 is to be estimated. The zone of possibility 110 may thus represent an envelope within which the device 102 will almost surely be found.

Within the zone of possibility 110, various likely areas 112a-112f are shown as areas in which the mobile device 102 can likely travel given the length of time between the last transmission and the time at which likely location is to be determined. Shown here, the smallest likely area is the traffic-based travel area 114, which is the distance the mobile device 102 has likely traveled given the length of time between the last transmission and the current known traffic conditions of the roadway 104. The other areas 112a-112f may, in one example, be likely outer edges of travel for times in the future, such as distance computed for 5-minute increments in time. Such curves can thus provide an indication of where the device 102 is and will be.

Alternatively, or in addition, the areas 112a-112f may each represent probabilities that the mobile device 102 has traveled to a particular location. Here, each line shows probabilities at speeds above and below the distance for the traffic speed 114. In particular, to determine a curve representing a probability that a car has traveled a certain distance, the roadways available to a traveler can be modeled as a tree, where each intersection, or decision point for a traveler, is modeled as a node and the root for the tree is the traveler's last known location. To compute likely distances, a system can traverse the tree using various speeds (e.g., which can be expressed as percentages of normal or maximum speeds) for each road segment between each node, until the elapsed time between the last known location of a device 102 and the current time (or a selected future time) has expired. The union of all such computed terminus points can represent a line or curve of equal likelihood that can be displayed on a map to a user (in a display that would look something like the curved lines shown in FIG. 1).

To determine speeds for device 102, prior speeds for the device 102 may be computed by measuring the time and distance between location 102a, location 102b, and the location of device 102 at its last known location. Those speeds may be compared to nominal traffic speeds in such locations (e.g., as a percentage of posted speeds or as a percentage of currently observed mean traffic speeds) and such percentage may be applied to speeds on other roadways in front of the last known location to determine a most-likely distance along each roadway that the device 102 has traveled by a selected time. Such a distance may be represented by location 112d, the middle line in this example. Other speeds (such as at certain percentage levels above and below the most likely speeds) may be applied to the possible road segments in order to generate the other locations 102a-c and 102e-f—which may be considered to be less likely because they differ from the speed at which the device 102 was traveling before it disappeared (either as an absolute speed, or as a speed relative to the speed of other traffic).

The particular locations 112a-112f have been smoothed here between the particular roadways to provide a smoother appearance to the display. In reality, the locations 112a-112f would literally follow only the available roadways, though visual observation of such road-by-road progress may provide a less pleasing way to understand where a vehicle might be located. Nonetheless, certain interfaces may be provided for displaying information such as that shown here, including by showing zones of likelihood by, for example, "painting" roadways in an area in appropriate colors. For example, roadways closest to a last known location could be painted red to show that it is very likely the device 102 is located somewhere along those roadways, whereas roadways father from the last known location may be shown in other colors.

Other factors may also be used in determining the likelihood that the device is in a particular area, or location. For example, if the device 102 has been determined to be in a vehicle on a roadway, a maximum possible speed may be determined for the device, and a map encompassing the area for the maximum possible speed may be retrieved. Various roadways in the area may then be identified, along with possibilities that the device 102 may be in those areas. As explained above and below, for instance, a likelihood value may be applied to an area based on the speed-above-normal that a device 102 would need to achieve in order to get to the area in a certain amount of time. For example, normal speeds may be computed for each roadway segment—such as by reference to known speed limit or to real-time traffic speed information—and various locations within a zone of possibility 110 for the device 102 may be identified. For each location, the speed needed to reach the locations may be determined as a function of the normal determined speed. The likelihood of the device 102 being at that location may then be determined as an inverse of such speeds.

The additional areas (e.g., locations 112a-112f) can also be identified within the zone of possibility 110 based on behavioral information. For example, it is generally unlikely that a person will suddenly change direction entirely. Thus, areas in front of the last determined travel direction for a device 102 can be favored over direction behind. A particular geometric shape can be used to represent such likelihood of travel, such as a teardrop shape, ellipse, or a circle. In addition, observed actions by drivers may also be determined. For example, general behavioral research on traffic flow may show that users turn right a certain percentage of the time when faced with a choice. Likewise, travel level data may also shown that a certain percentage of cars at a particular intersection turn right. Such statistics may be applied when determining the likely current location of a mobile computing device (e.g., smartphone or vehicle navigation system) and related vehicle.

As another example of information that can be used to determine a probability that a device 102 is in a particular area, a user can have traveled a path previously, so that the likelihood of the user taking the same path is increased in a model for computing possibilities. For example, the device 102 can have transmitted data from previous periods of travel. If such data is available, the previous history can be available to determine likely paths for the device 102 to travel along the roadway 104. As one particular example, a user of a device 102 can take a specific path to school every day. Data from previous trips can be used to calculate the probability that the user is taking the same path, and the speeds at which the user travels that path to school.

In another implementation, the data can be provided from a source outside of the mobile device 102. If the owner of the device 102 is a student on a city bus, it is likely that the student takes this path on a daily basis. The path of the bus may follow previous speeds and locations, providing a history to increase the likelihood of the device 102 to be in a specific area. Other similar uses may also be analyzed to provide better estimates of a device's current location.

In a similar manner, movement information from other devices may also be used to infer a current or future location of device 102. For example, if analysis of locations 102a, 102b show movement that is common with that of other devices, it may be inferred that the device 102 is in the same vehicle (e.g., a bus or train) with the other devices, and the locations of those devices may be used as a basis for inferring a location of device 102.

The probability that a device 102 will be at a particular location among the possible locations since its last known location can also be determined through the contacts of the owner of the mobile device 102. For example, the location of the user's home, as well as those of relatives and friends, can be used to increase the probability that a device 102 will travel along the path toward one of those locations. In one implementation, the locations of various known homes can act as "magnets," creating a stronger "pull" for the device 102 in those directions. Additionally, some locations can have stronger "pulls" for the device 102 than others, such as the owner's home as compared to the owner's cousin's home. In another example, the "pull" of a location can be stronger depending on the time of the calculation. If the owner is often at school during the calculation, the school can have a stronger "pull" than the owner's home. Such "pull" forces may be represented as weightings to be used in determining a likelihood score for various possible locations in which a device may be located.

The probability of a device 102 traveling in a specific direction can also be dependent on the current situation of the owner of the device 102. If the owner is trying to reach a specific location, a user seeking to locate the owner can input that location to display the paths the device 102 would most likely take. For example, a calendar for the owner of the device 102 may be accessed, and a location of an appointment for the owner around the time of last contact may be used to weight the likely locations toward the location of the appointment. In an alternative example, if the owner of the device 102 is attempting to evade the police and is near a border, the paths on the roadway 104 the device 102 can take to the border can be calculated as having a higher probability.

As mentioned above, the travel direction of the device 102 (e.g., as determined by the direction the device traveled between two reporting points before its last known location) can have a substantial effect on the predicted locations for the device. Such a direction can be determined as an angle between the last two known locations of the device 102, or between the last several known locations. Likewise, if the last reported location is determined to be on a roadway (e.g., by comparing the device locations to roadways on commercially available mapping data), the device 102 can be presumed to be traveling along the roadway in the general direction indicated by the last two reported locations. For example, if the last reported location is SSE of the second-to-last reported location, and the device 102 is determined to be on an E-W roadway, the direction of the device 102 can be presumed to be East. In contrast, if the device 102 is on a N-S roadway, the direction of the device 102 can be presumed to be South.

The locations to be predicted by the features shown here may be a current location, a prior location, or a future location. For example, a user may wish to determine the likelihood of a location for device 102 in a time period in the future even if the device 102 is still broadcasting its current location (e.g., so as to move ahead and meet the owner of the device, and to have an idea of the probability that the device 102 can be intercepted if the interception occurs at a particular location). For example, the user may want to determine where a device 102 will travel in the next 10 minutes, so as to be able to meet the owner of the device 102. Alternatively, the user may wish to determine the likelihood of locations in various time intervals, given the present location. For example, a user may need to determine the likely travel time for a user to prepare dinner at the correct time. In another embodiment, the user may wish to input a time period to determine the likelihood of a device 102 being in a location at that future period in time using the current travel location, direction, and speed of the device 102.

Using the travel location, direction, and speed, a mode of transportation can also be determined. For example, if a device 102 is moving along a public transportation corridor, such as a rail line, the device 102 can be assumed to be on a train. If the device 102 is moving quickly along a highway, the device 102 can be assumed to be located inside a vehicle such as a car, truck, or bus. The device 102 can further be assumed to be inside a bus if its motions match those of other devices. If the speed and location of the device 102 does not match roadways, or speeds match that of a human-powered vehicle, the device 102 can be assumed to be located on a vehicle such as a skateboard or a bicycle. The mode of transportation can be used to determine future actions of the device 102, along with presumed speeds for the device 102.

The mobile device 102 can be tracked, according e.g., to the techniques just described, at various times for various reasons. For example, the locations for a device 102 may be determined in response to a user request, such as a request from law enforcement personnel or a friend of the person who owns the device 102. Alternatively, predicted locations may be determined automatically whenever a device fails to report a location for a particular period, or as the result of some other similar event.

The various concepts described here and shown in FIG. 1 can be displayed graphically to a user requesting a location of device 102. For example, a GUI on an apparatus such as a computer can display a similar representation to the representation shown in FIG. 1. In such an interface, the device 102 can be shown as a car driving on a roadway 104, or as another mode of transportation that is consistent with the speed the device 102 (e.g., pedestrian, bus, train, plane, etc.).

The area in which the device 102 travels can also be displayed in various styles other than those shown here. For example, the roadway 104 or roadways on which the device 102 travels can be displayed as a street map. Alternatively, the area can be displayed using a satellite map. In another implementation, the area can be displayed using a traffic map. The area can also be displayed using a hybrid of maps, such as a combination of a satellite map and a street map. The display method can be chosen by the user, or alternatively, be determined according to the associated display device. Also, different levels of detail may be displayed to a user, such as by showing only major roadways in a zone of possibility 110.

The different predicted areas for a device's location may also be displayed in various manners. For example, locations calculated based on speeds that are below the legal limit, within the legal limit, and above the legal limit can be displayed as a temperature map, where different speeds or likelihoods are displayed in a different color, with the colors changing relatively smoothly with changes in probabilities. In addition, the zone of possibility 110 can be displayed with a marking associated with the probability of travel at illegal speeds.

As time continues after a map is initially displayed showing likely locations for device 102, calculations used to create a display such as that shown in FIG. 1 can be refreshed and updated. In some implementations, new calculations can be generated and displayed on a periodic basis. For example, the periodic basis may be short enough that the display is animated such that the lines showing predicted probabilities move slowly outward from the last known location for the device 102. In other implementations, the user can choose to generate new calculations to be displayed. In still other implementations, a new location reported by the device 102 can trigger a new calculation and new display, such that the likely locations of the device 102 are reset as the actual observed location, and predicted locations are then computed from that last known location. Thus, for instance, where a device reports its location infrequently, predicted locations may be repeatedly determined between each successive reporting of location, and the system may be reset each time a location is reported.

Figure 2:
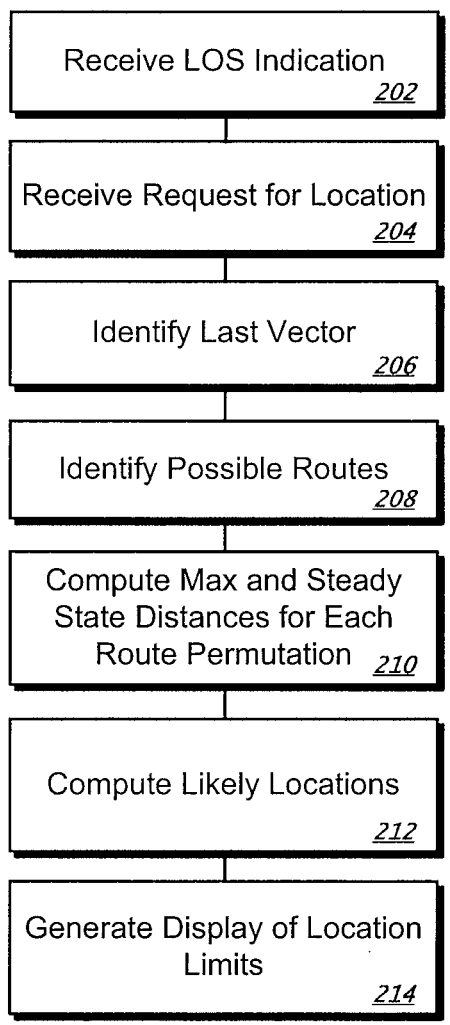
FIG. 2 is a flow chart showing an example of a process 200 for determining likely locations of a mobile device.

FIG. 2 is a flow chart showing an example of a process 200 for determining likely locations of a mobile device. The process 200 generally involves responding to a request for a location of a device by identifying a last known vector for the device, identifying routes along which the device may have traveled after its last reported location, and determining likelihoods that the device is currently located along or on one of those routes (or within a particular area), for display to the requester of the information.

At an initial step, the process 200 receives (202) a loss of signal (LOS) indication. For example, a mobile device can travel through a tunnel and the mobile device's signal cannot be received. The LOS indication 202 may be explicit, in that a system may report to the process 200 when a particular device has stopped reporting its location. The LOS may also be implicit, such as when a device fails to report its location within a predetermined time period.

The process 200 then receives (204) a request for location. For example, a user (e.g., a law enforcement officer) may want to learn the location of another user. The first user may provide to the process 200 an identifier for the second user, and may use that information to request information showing estimates or predictions of the second user's current or future location.

The process 200 then identifies (206) a last vector for the second user. For example, locations such as the previously known locations 102a-102b in FIG. 1 can be used in conjunction with the mobile device's last transmission in order to determine the speed and direction of the mobile device around the time of its last transmission of location data. As one example, a prior reported location may have been 5 miles due West of the last known location, and may have been reported 5 minutes before the reporting of the last known location. In such a situation, the vector for the device may be computed to be that of travel due East at 60 miles per hour.

Possible routes are then identified (208). For example, information regarding the roadways in the direction of travel of the device (as determined from the computed vector) may be determined for a zone of possibility. As one example, the zone of possibility may first be determined to produce a bounded box for a geographic area in which a device may be located, and such a bounded box may be submitted to a geographic information service, such as the Google Maps service, to obtain roadway information in the area. The roadways in the area may then be modeled by a tree structure moving away from the last known location (i.e., with the last known location as a root), so that each intersection represents possible directions the device may have gone, and thus is represented by a node having multiple branches in the model. Each branch of the tree may be assigned a distance (i.e., the distance of the particular road segment) and a speed (e.g., a speed limit for the segment, or real time traffic speed from, for example, a commercial service that tracks traffic speeds).

Maximum and steady state distances for each route permutation may then be computed. Maximum distance may be computed by applying a maximum speed for a vehicle for each segment (e.g., 200 percent of the speed limit) for the elapsed time between a time of a last known position and a time for which a likelihood of location is to be computed. Steady state distances may be other distances below a maximum distance, which may be computer for other-than-maximum speeds such as 100 percent of the speed limit, 150 percent of the speed limit, 20 percent above current traffic speed, etc.

In the example discussed here, each branch in the tree model may be traversed at the relevant speed for that branch (e.g., at some percentage of the speed limit for the road segment) until travel times for all branches are determined, and terminal distances for each branch are also determined. The union of all the terminal distances for a particular speed (or a group of speeds if the speeds for different segments are different) and for a particular elapsed time will represent distances of common likelihood, like the locations 112*a*-112*f* in FIG. 1. Such a group of points may be termed a likely location (box 212), or a line of equal likelihood of location.

At box 214, a display of location limits is generated and provided to a user. The display may include graphical mapping information, such as that obtained from a commercial mapping service, that is overlaid with graphical indicators of a location or locations for a device being tracked. The display may take a form similar to the schematic information shown in FIG. 1, or may take a variety of other forms.

In one implementation, information for a location of a user other that the user being tracked may be displayed (including along with information about the user being tracked). For example, a law enforcement officer may be tracking a criminal whose signal has disappeared, and may be provided with a display like that shown in FIG. 1. In addition, a system generating the display could also show future locations for the officer herself. Such locations may be determined by capturing (e.g., via GPS) the officer's current location and extrapolating a future location, such as by using the officer's current speed (or percentage of current speed relative to the speed limit, or relative to current average traffic speed around the officer). A future path for the officer may be computed so as to create an intersection with a likely future location of the criminal. Because the officer may control her own speed, the curves denoting future locations for the officer may relate to elapsed times to certain locations rather than to probabilities. The times may be updated as the officer travels (e.g., either at a higher-than-expected or lower-than-expected speed). In this manner, the officer will be able to see, in real time, the expected time at which he will intercept the criminal, or at least enter a zone in which it is likely that the criminal still is located. Various additional applications of the features discussed above may also be employed.

Figure 3:
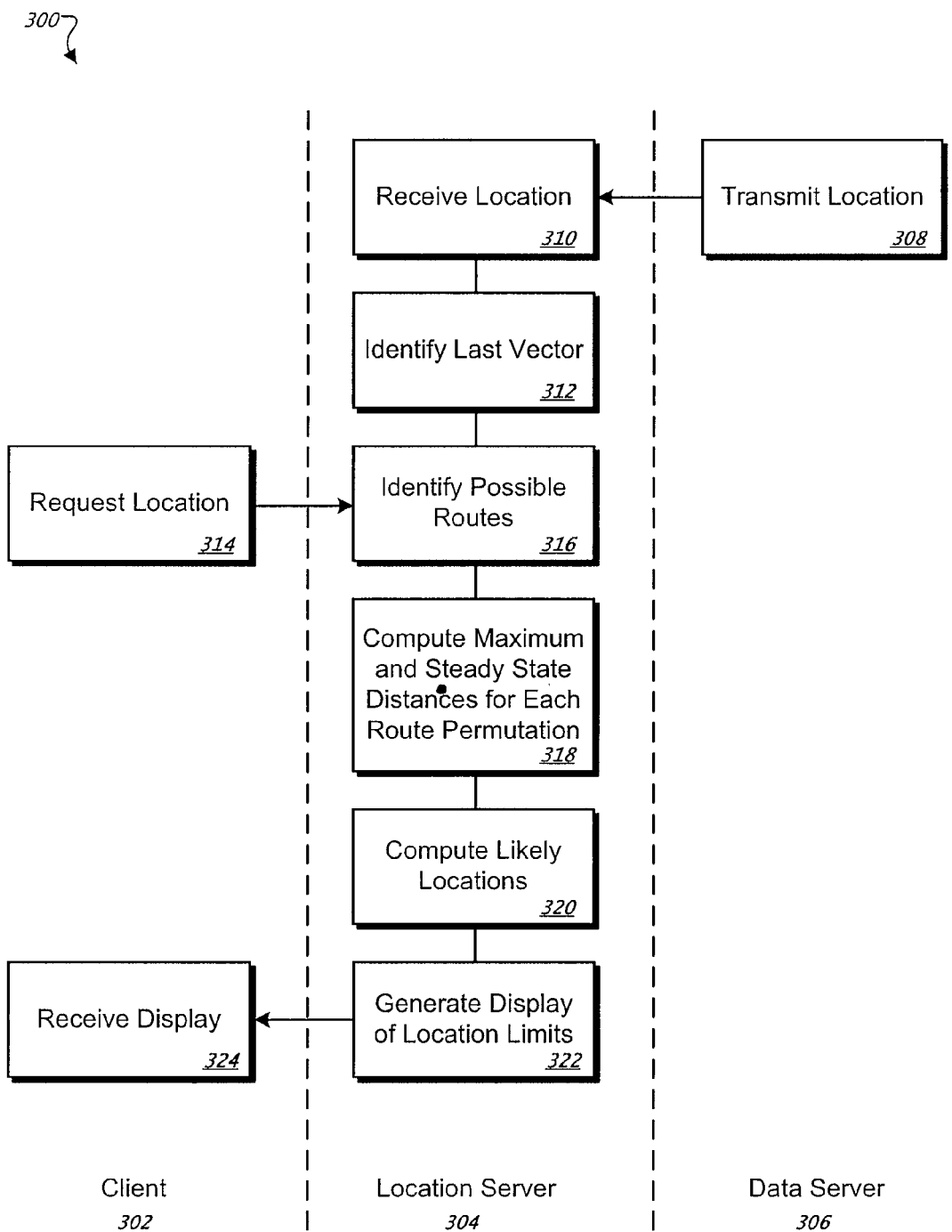
FIG. 3 is a sequence diagram depicting an example of interactions 300 between a client 302, a location server 304, and a data server 306.

FIG. 3 is a sequence diagram 300 depicting an example of interactions between a client 302, a location server 304, and a data server 306. Initially, at box 308, the data server 306 transmits a location of a mobile device to the location server 304, such as coordinates or street addresses. For example, the data server 306 can send the coordinates "42° 49' 55.44"N, 78° 47' 49.84"W" or an equivalent to the location server 304. The data server 306 may previously have been tracking a mobile device (e.g., cellular telephone or vehicle navigation system) that has since gone missing, and may have stored the last known location of the device. The data server 306 may include, for example, servers associated with a wireless carrier to which the device is subscribed, or other appropriate servers for tracking locations of wireless devices (e.g., a service to which an owner of a wireless device may subscribe and have their wireless device periodically report on its location).

The location server 304 receives the last location at box 310. The location server 304 may include, for example, one or more servers that are part of an online information provider such as Google, that are configured to make computations and determinations regarding a likely location of a device after its last reported location, such as in the manners described above. In some implementations, the location server 304 can convert the location from coordinates to a street address for display purposes. For example, the location server 304 can translate the coordinates "42° 49' 55.44"N, 78° 47' 49.84"W" to the street address "234 Tampa Drive, Buffalo, N.Y. 14220".

The location server 304 then identifies the last vector (312) for the mobile device, including speed and direction. In some implementations, the location server 304 can take previously known locations and compute the speed and direction of the mobile device using the time and location differences between or among those locations. In other implementations, the mobile device can also transmit current speed and traveling direction to the location server 304 with its location, or to the data server 306.

At some point, the client 302 can initiate a request for location (box 314) to the location server 304. When a request is received, the location server 304 can identify possible routes 316 using the last known vector. In addition, the request from the client 302 may trigger the location server 304 to obtain the location information from the data server 306 (so that such information need not be transferred to the location server until there is a need for such information). Such a request may also require a certain level of authentication so as protect the privacy of the user whose last known location is being sought (e.g., enforcing a system that grants access only by permission of the user or court order).

With the information concerning the user's last known locations, the location server 304 can compute maximum and steady state distances for each route permutation (box 318). In certain implementations, the location server 304 can incorporate data from outside sources, such as traffic patterns, prior location history, and locations of a user's home or homes of relatives and friends.

The location server 304 then generates data (e.g., mark-up code) for creating a display of the location limits (box 322) and for generating a map with the limits, and sends the data to the client 302. The location limits may include, for example, a single curve (or a grouping of curves) showing a likelihood that a device is at particular locations in a geographic area.

The client 302 then receives the data for a display (box 324), and provides the display for review by a user, such as in a web browser. In some implementations, the display may be a graphical representation of the various likely locations superimposed on a street map, with the likely locations shaded to show the differences in likelihood for each zone, or the likely locations at different times. Alternatively, the display may be a graphical display including animation of the likely locations, refreshed from the location server frequently enough to provide the user with fresh data. In still other implementations, the display may be text-based.

Figure 4:
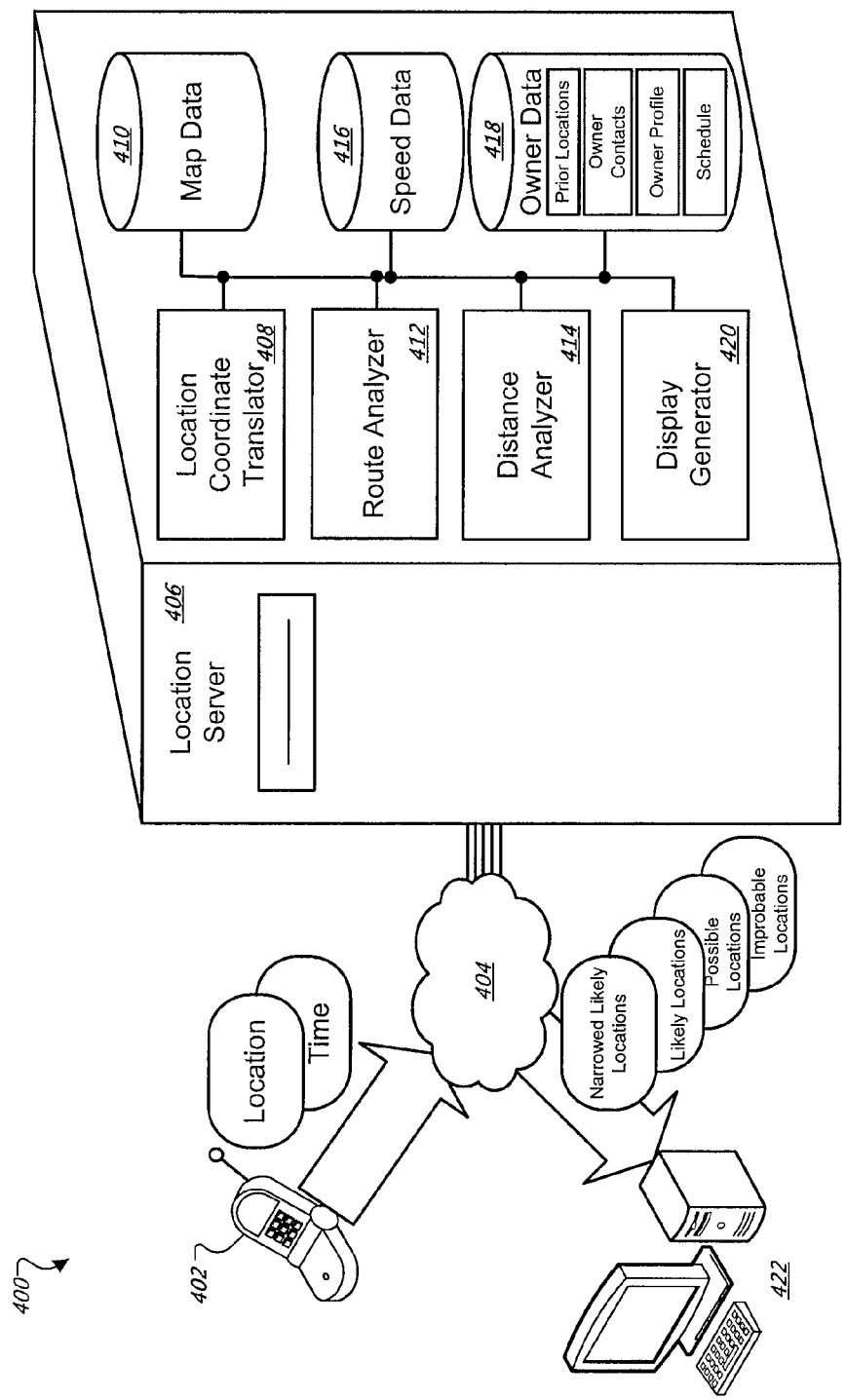
FIG. 4 is a schematic diagram of a system 400 for tracking and predicting a location of a mobile device.

FIG. 4 is a schematic diagram of a system 400 for tracking and predicting a location of a mobile device. The system 400 includes a mobile device 402, a location server 406, and a computing device 422. Here, a mobile device 402 can transmit information regarding its location through the Internet 404 to a location server 406. (In another embodiment, the location information may come, not from the device 402, but from components in the network, such as by tower triangulation.) The location server 406 can predict the likely locations of a mobile device using the location provided by the mobile device 402. The location server 406 can then transmit the likely locations to the computing device 422 to allow a user to view the predictions of the location server 406. For example, if a user wants to determine the location of hazardous material traveling via a truck, but the GPS device on the truck has been damaged, the user can view possible locations on the computing device 422.

The location server 406 uses a variety of components to predict the location of a mobile device 402, such as a location coordinate translator 408, a route analyzer 412, a distance analyzer 414, and a display generator 420, as well as a map data source 410, a speed data source 416, and a user data source 418.

The location coordinate translator 408 can receive location information associated with a device and translate the location information into a preferred format. As discussed further below, the location coordinate translator 408 can also determine a last vector for the device. The route analyzer 412 can receive the last vector for the mobile device 402 and calculate possible locations based on the speed and direction of the mobile device 402. The distance analyzer 414 can narrow the possible locations that the mobile device 402 may be to the likely locations that the mobile device 402 may be, based on likely speeds traveled by the device and also on likely routes to be taken by a user of the device. To find the narrowed likely locations a mobile device 402 may be, the display generator can filter the likely locations with user-specific data. As described further below, the different available data can provide a higher probability that a mobile device 402 may be in a specific area.

The data sources in the location server 406 can provide contextual information to predict the location of the mobile device 402. For example, the map data source 410 can provide information to determine improbable locations for the mobile device 402 to travel, such as a mountain in the path of a mobile device's 402 otherwise likely trajectory. The map data source 410 can include data such as roadways, and natural and man-made structures. The speed data source 416 can include information regarding the speed limits on various roadways or even the traffic conditions for a particular roadway at a specified time. The user data source 418 can provide information relevant to the user, such as prior locations, user contacts, a user profile and schedule, all discussed further below.

When receiving information from the mobile device 402, the location server 406 can receive a data regarding a location and may also receive a data indicating a time corresponding to a particular location. The location server 406 can send transmitted locations to the location coordinate translator 408. The location coordinate translator 408 can interpret the location from the mobile device 402 into terminology that the location server 406 can understand. Using data from the map data source 410 and the time associated with the location information, the location coordinate translator 408 can determine a last vector. For example, the map data source 410 may provide information that at 3:52 p.m., a shipment of hazardous materials was on I-95 heading west toward New York City from Stamford, Conn. In some embodiments, the map data source 410 can also provide data to determine improbable areas, such as the Atlantic Ocean, buildings near the highway, or the other side of the interstate. Such improbable areas may be set out by inference, such as by the system determining likely paths along roadways, where there are no roadways in the improbable areas.

The route analyzer 412 can determine possible locations using the last vector and data from the map data source 410. For example, the route analyzer may model points in a geographic area as a tree of possible routes that the device may take, with each intersection at a node in the tree and each road segment a branch in the tree. The route analyzer 412 may then traverse the tree while applying various speeds for the device until the elapsed time between the last reporting of a last known location and the present time (or some other chosen time) has elapsed. As indicated above, the terminus point along each route permutation from such a technique may represent a curve of equal likelihood for a certain travel speed.

The route analyzer 412 can also use geometric shapes to determine the possible locations. For example, when trying to find a child lost in a park, the route analyzer 412 can use a circle to determine the possible locations of the child's mobile device 402. Conversely, for a truck carrying hazardous materials on a busy highway, the route analyzer 412 can use a teardrop shape biased in the direction of the trucks last known travel direction or biased along a roadway on which the truck was last traveling.

Using the distance analyzer 414, the location server 406 can include speed information from the speed data source 416 to narrow the possible locations of the mobile device 402 to the likely locations. For example, if the speed data source 416 has information regarding the traffic conditions on I-95 in Connecticut, the distance analyzer can determine the likely locations of the mobile device 402 on the truck is likely 45 m.p.h., and therefore, the truck is within a particular area of I-95. Such determinations may be made in a manner similar to the tree model example provided above.

In some implementations, the location server 406 may also include information from the user data source 418 to further narrow the likely locations. As described above, the user data source 418 can include data regarding prior locations of the mobile device 402, contacts of the mobile device's 402 user, user profile information, and the user's schedule. Using this data, the display generator 420 can determine the narrowed likely locations for the mobile device 402. For example, the user data source 418 may store a month's worth of locations transmitted from the mobile device 402. In such an embodiment, the more common a user travels to a particular location, the stronger the likelihood that the user will return to that location. Alternatively, the user data source 418 may store data regarding the user's personal connections, such as family and friends, to determine likely destinations. The user would more likely travel to a known person's dwelling than a stranger's house.

In addition, with data from the user's profile, such as age or gender, certain decisions by a driver or other tracked user may be more or less likely. For example, if a twelve-year-old girl needs to be located, it is less likely that she is at the Department of Motor Vehicles than the mall a half-mile away. Alternatively, using the user's schedule, one may find it is likely that a truck holding hazardous material is at a fast food restaurant, because the driver stops at 4:00 p.m. to eat dinner before traveling through New York City. In another example, the twelve-year-old girl may have had an orthodontist's appointment that makes it likely that she is near that particular location.

After the various locations for the mobile device 402 are determined, the display generator 420 can generate data for forming a display, such as HTML/CSS code or other similar data. The location server 406 can send the display data through the Internet 404 to a computing device 422, such as a personal computer or another mobile device. In other implementations, the narrowed likely locations can be transmitted from the location server 406 via audio communication, such as in the form of likely coordinates or a street address and direction. For example, when trying to find a child during an Amber Alert, the narrowed likely locations can be transmitted from the location server 406 to a police car radio via street addresses.

In some implementations, the location server 406 and the computing device 422 may be part of the same system, such as a second mobile device that can compute the probability of the mobile device 402 being in a particular location. For example, when trying to find a child lost in a store, a parent can search for her daughter using the system described above tracking her daughter's mobile device with her own mobile device while still in the store.

Figure 5:
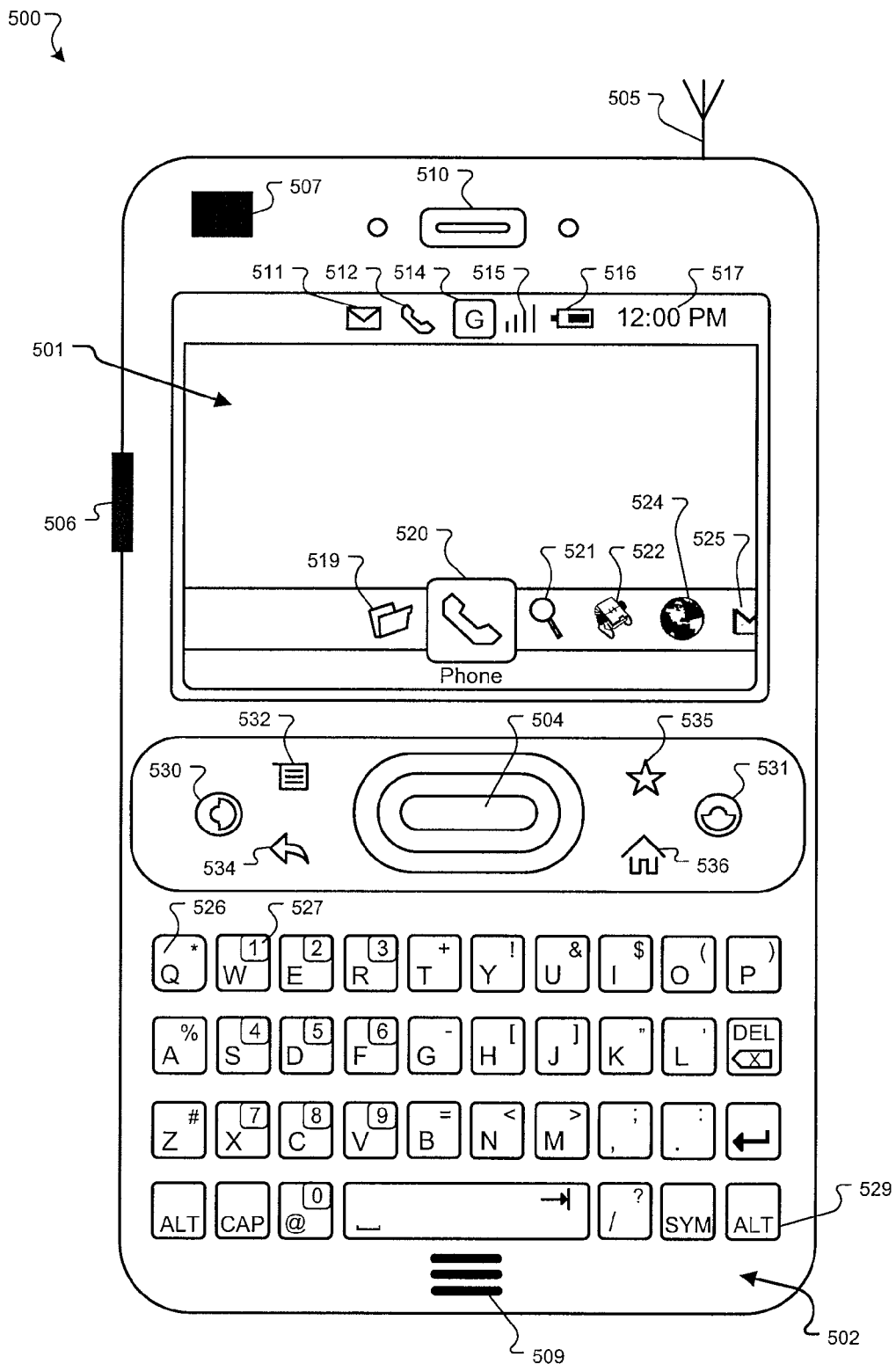
FIG. 5 is a schematic representation of an exemplary mobile device that implements embodiments of the tracking techniques described herein.

Referring now to FIG. 5, the exterior appearance of an exemplary device 500 that implements the systems and methods for tracking a mobile device are illustrated. Briefly, and among other things, the device 500 includes a processor configured to enable tracking upon request.

In more detail, the hardware environment of the device 500 includes a display 501 for displaying text, images, and video to a user; a keyboard 502 for entering text data and user commands into the device 500; a pointing device 504 for pointing, selecting, and adjusting objects displayed on the display 501; an antenna 505; a network connection 506; a camera 507; a microphone 509; and a speaker 510. Although the device 500 shows an external antenna, the device 500 can include an internal antenna, which is not visible to the user.

The display 501 can display video, graphics, images, and text that make up the user interface for the software applications used by the device 500, and the operating system programs used to operate the device 500. Among the possible elements that may be displayed on the display 501 are a new mail indicator 511 that alerts a user to the presence of a new message; an active call indicator 512 that indicates that a telephone call is being received, placed, or is occurring; a data standard indicator 514 that indicates the data standard currently being used by the device 500 to transmit and receive data; a signal strength indicator 515 that indicates a measurement of the strength of a signal received by via the antenna 505, such as by using signal strength bars; a battery life indicator 516 that indicates a measurement of the remaining battery life; or a clock 517 that outputs the current time.

The display 501 may also show application icons representing various applications available to the user, such as a web browser application icon 319, a phone application icon 520, a search application icon 521, a contacts application icon 522, a mapping application icon 524, an email application icon 525, or other application icons. In one example implementation, the display 301 is a quarter video graphics array (QVGA) thin film transistor (TFT) liquid crystal display (LCD), capable of 16-bit or better color.

A user uses the keyboard (or "keypad") 502 to enter commands and data to operate and control the operating system and applications that provide for a tracking system. The keyboard 502 includes standard keyboard buttons or keys associated with alphanumeric characters, such as keys 526 and 527 that are associated with the alphanumeric characters "Q" and "W" when selected alone, or are associated with the characters "*" and "1" when pressed in combination with key 529. A single key may also be associated with special characters or functions, including unlabeled functions, based upon the state of the operating system or applications invoked by the operating system. For example, when an application calls for the input of a numeric character, a selection of the key 527 alone may cause a "1" to be input.

In addition to keys traditionally associated with an alphanumeric keypad, the keyboard 502 also includes other special function keys, such as an establish call key 530 that causes a received call to be answered or a new call to be originated; a terminate call key 531 that causes the termination of an active call; a drop down menu key 532 that causes a menu to appear within the display 301; a backward navigation key 534 that causes a previously accessed network address to be accessed again; a favorites key 535 that causes an active web page to be placed in a bookmarks folder of favorite sites, or causes a bookmarks folder to appear; a home page key 536 that causes an application invoked on the device 300 to navigate to a predetermined network address; or other keys that provide for multiple-way navigation, application selection, and power and volume control.

The user uses the pointing device 504 to select and adjust graphics and text objects displayed on the display 501 as part of the interaction with and control of the device 500 and the applications invoked on the device 500. The pointing device 504 is any appropriate type of pointing device, and may be a joystick, a trackball, a touch-pad, a camera, a voice input device, a touch screen device implemented in combination with the display 501, or any other input device.

The antenna 505, which can be an external antenna or an internal antenna, is a directional or omni-directional antenna used for the transmission and reception of radiofrequency (RF) signals that implement point-to-point radio communication, wireless local area network (LAN) communication, or location determination. The antenna 505 may facilitate point-to-point radio communication using the Specialized Mobile Radio (SMR), cellular, or Personal Communication Service (PCS) frequency bands, and may implement the transmission of data using any number or data standards. For example, the antenna 505 may allow data to be transmitted between the device 500 and a base station using technologies such as Wireless Broadband (WiBro), Worldwide Interoperability for Microwave ACCess (WiMAX), 3GPP Long Term Evolution (LTE), Ultra Mobile Broadband (UMB), High Performance Radio Metropolitan Network (HIPERMAN), iBurst or High Capacity Spatial Division Multiple Access (HC-SDMA), High Speed OFDM Packet Access (HSOPA), High-Speed Packet Access (HSPA), HSPA Evolution, HSPA+, High Speed Upload Packet Access (HSUPA), High Speed Downlink Packet Access (HSDPA), Generic Access Network (GAN), Time Division-Synchronous Code Division Multiple Access (TD-SCDMA), Evolution-Data Optimized (or Evolution-Data Only) (EVDO), Time Division-Code Division Multiple Access (TD-CDMA), Freedom Of Mobile Multimedia Access (FOMA), Universal Mobile Telecommunications System (UMTS), Wideband Code Division Multiple Access (W-CDMA), Enhanced Data rates for GSM Evolution (EDGE), Enhanced GPRS (EGPRS), Code Division Multiple Access 2000 (CDMA2000), Wideband Integrated Dispatch Enhanced Network (WiDEN), High-Speed Circuit-Switched Data (HSCSD), General Packet Radio Service (GPRS), Personal Handy-Phone System (PHS), Circuit Switched Data (CSD), Personal Digital Cellular (PDC), CDMAone, Digital Advanced Mobile Phone System (D-AMPS), Integrated Digital Enhanced Network (IDEN), Global System for Mobile communications (GSM), DataTAC, Mobitex, Cellular Digital Packet Data (CDPD), Hicap, Advanced Mobile Phone System (AMPS), Nordic Mobile Phone (NMP), Autoradiopuhelin (ARP), Autotel or Public Automated Land Mobile (PALM), Mobiltelefonisystem D (MTD), Offentlig Landmobil Telefoni (OLT), Advanced Mobile Telephone System (AMTS), Improved Mobile Telephone Service (IMTS), Mobile Telephone System (MTS), Push-To-Talk (PTT), or other technologies. Communication via W-CDMA, HSUPA, GSM, GPRS, and EDGE networks may occur, for example, using a QUALCOMM MSM7200A chipset with an QUALCOMM RTR6285™ transceiver and PM7540™ power management circuit.

The wireless or wired computer network connection 506 may be a modem connection, a local-area network (LAN) connection including the Ethernet, or a broadband wide-area network (WAN) connection such as a digital subscriber line (DSL), cable high-speed internet connection, dial-up connection, T-1 line, T-3 line, fiber optic connection, or satellite connection. The network connection 506 may connect to a LAN network, a corporate or government WAN network, the Internet, a telephone network, or other network. The network connection 506 uses a wired or wireless connector. Example wireless connectors include, for example, an INFRARED DATA ASSOCIATION (IrDA) wireless connector, a Wi-Fi wireless connector, an optical wireless connector, an INSTI- TUTE OF ELECTRICAL AND ELECTRONICS ENGINEERS (IEEE) Standard 802.11 wireless connector, a BLUETOOTH wireless connector (such as a BLUETOOTH version 1.2 or 3.0 connector), a near field communications (NFC) connector, an orthogonal frequency division multiplexing (OFDM) ultra wide band (UWB) wireless connector, a time-modulated ultra wide band (TM-UWB) wireless connector, or other wireless connector. Example wired connectors include, for example, a IEEE-1394 FIREWIRE connector, a Universal Serial Bus (USB) connector (including a mini-B USB interface connector), a serial port connector, a parallel port connector, or other wired connector. In another implementation, the functions of the network connection 506 and the antenna 505 are integrated into a single component.

The camera 507 allows the device 500 to capture digital images, and may be a scanner, a digital still camera, a digital video camera, other digital input device. In one example implementation, the camera 507 is a 3 mega-pixel (MP) camera that utilizes a complementary metal-oxide semiconductor (CMOS).

The microphone 509 allows the device 500 to capture sound, and may be an omni-directional microphone, a unidirectional microphone, a bi-directional microphone, a shotgun microphone, or other type of apparatus that converts sound to an electrical signal. The microphone 509 may be used to capture sound generated by a user, for example when the user is speaking to another user during a telephone call via the device 500. Conversely, the speaker 510 allows the device to convert an electrical signal into sound, such as a voice from another user generated by a telephone application program, or a ring tone generated from a ring tone application program. Furthermore, although the device 500 is illustrated in FIG. 3 as a handheld device, in further implementations the device 500 may be a laptop, a workstation, a midrange computer, a mainframe, an embedded system, telephone, desktop PC, a tablet computer, a PDA, or other type of computing device.

Figure 6:
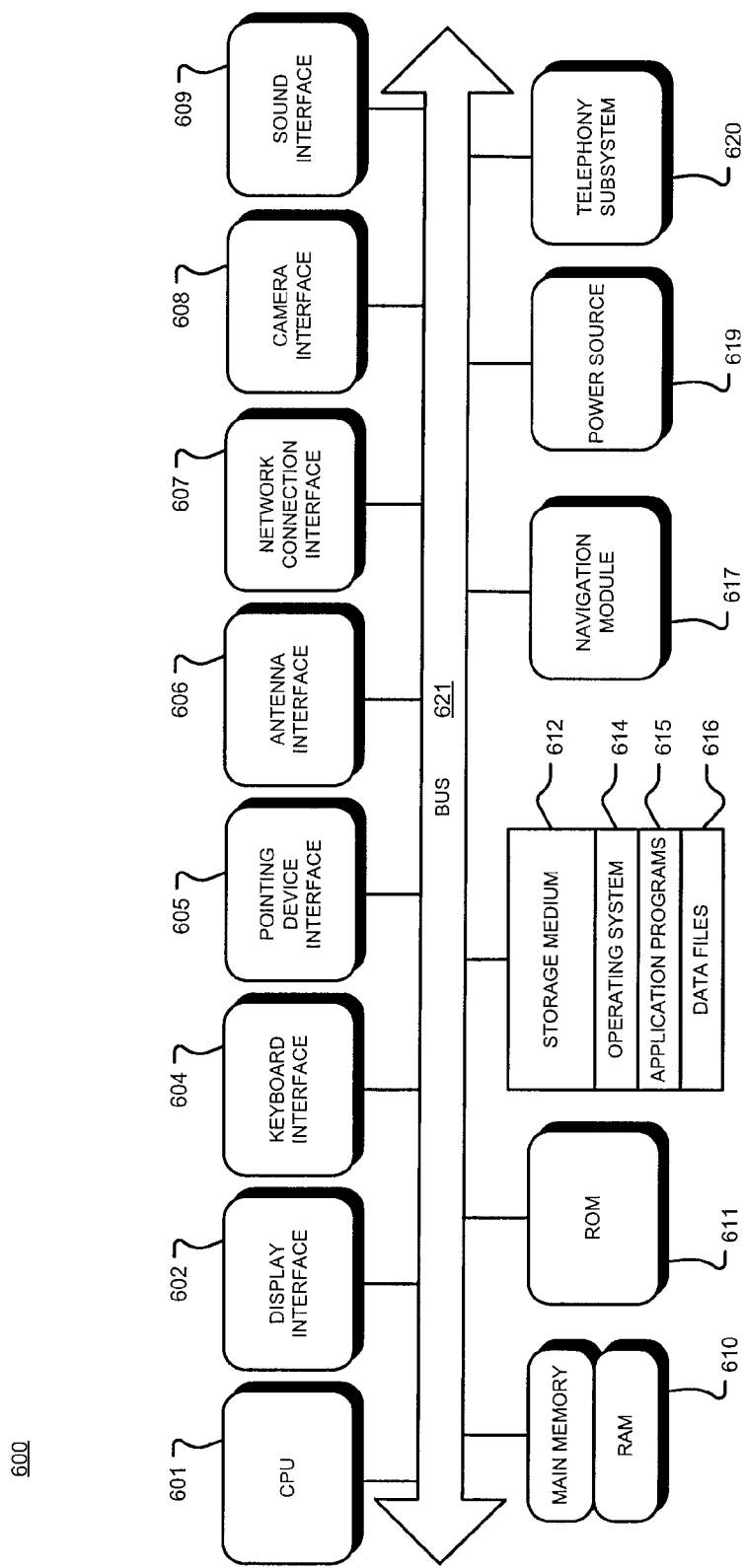
FIG. 6 is a block diagram illustrating the internal architecture of the device of FIG. 5.

FIG. 6 is a block diagram illustrating an internal architecture 600 of the device 500. The architecture includes a central processing unit (CPU) 601 where the computer instructions that comprise an operating system or an application are processed; a display interface 602 that provides a communication interface and processing functions for rendering video, graphics, images, and texts on the display 601, provides a set of built-in controls (such as buttons, text and lists), and supports diverse screen sizes; a keyboard interface 604 that provides a communication interface to the keyboard 502; a pointing device interface 605 that provides a communication interface to the pointing device 504; an antenna interface 606 that provides a communication interface to the antenna 505; a network connection interface 607 that provides a communication interface to a network over the computer network connection 506; a camera interface 609 that provides a communication interface and processing functions for capturing digital images from the camera 507; a sound interface that provides a communication interface for converting sound into electrical signals using the microphone 309 and for converting electrical signals into sound using the speaker 510; a random access memory (RAM) 610 where computer instructions and data are stored in a volatile memory device for processing by the CPU 601; a read-only memory (ROM) 611 where invariant low-level systems code or data for basic system functions such as basic input and output (I/O), startup, or reception of keystrokes from the keyboard 502 are stored in a non-volatile memory device; a storage medium 612 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files that comprise an operating system 613, application programs 615 (including, for example, a web browser application, a widget or gadget engine, and or other applications, as necessary) and data files 619 are stored; a navigation module 617 that provides a real-world or relative position or geographic location of the device 500; a power source 619 that provides an appropriate alternating current (AC) or direct current (DC) to power components; and a telephony subsystem 620 that allows the device 500 to transmit and receive sound over a telephone network. The constituent devices and the CPU 601 communicate with each other over a bus 421.

The CPU 601 can be one of a number of computer processors. In one arrangement, the computer CPU 601 is more than one processing unit. The RAM 610 interfaces with the computer bus 621 so as to provide quick RAM storage to the CPU 601 during the execution of software programs such as the operating system application programs, and device drivers. More specifically, the CPU 601 loads computer-executable process steps from the storage medium 612 or other media into a field of the RAM 610 in order to execute software programs. Data is stored in the RAM 610, where the data is accessed by the computer CPU 601 during execution. In one example configuration, the device 500 includes at least 128 MB of RAM, and 256 MB of flash memory.

The storage medium 612 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 500 to access computer-executable process steps, application programs and the like, stored on removable and non-removable memory media, to off-load data from the device 500, or to upload data onto the device 500.

A computer program product is tangibly embodied in storage medium 612, a machine-readable storage medium. The computer program product includes instructions that, when read by a machine, operate to cause a data processing apparatus to store image data in the mobile device. In some embodiments, the computer program product includes instructions that enable a tracking system.

The operating system 613 may be a LINUX-based operating system such as the mobile device platform; APPLE MAC OS X; MICROSOFT WINDOWS NT/WINDOWS 2000/WINDOWS XP/WINDOWS MOBILE; a variety of UNIX-flavored operating systems; or a proprietary operating system for computers or embedded systems. The application development platform or framework for the operating system 613 may be: BINARY RUNTIME ENVIRONMENT FOR WIRELESS (BREW); JAVA Platform, Micro Edition (JAVA ME) or JAVA 2 Platform, Micro Edition (J2ME) using the SUN MICROSYSTEMS JAVASCRIPT programming language; PYTHON™, FLASH LITE, or MICROSOFT.NET Compact, or another appropriate environment.

The device stores computer-executable code for the operating system 613, and the application programs 615 such as an email, instant messaging, a video service application, a mapping application word processing, spreadsheet, presentation, gaming, mapping, web browsing, JAVASCRIPT engine, or other applications. For example, one implementation may allow a user to access the email application, an instant messaging application, a video service application, a mapping application, or an imaging editing and presentation application. The application programs 615 may also include a widget or gadget engine, such as a TAFRI™ widget engine, a MICROSOFT gadget engine such as the WINDOWS SIDEBAR gadget engine or the KAPSULES™ gadget engine, a YAHOO! widget engine such as the KONFABULTOR™ widget engine, the APPLE DASHBOARD widget engine, a gadget engine, the KLIPFOLIO widget engine, an OPERA™ widget engine, the WIDSETS™ widget engine, a proprietary widget or gadget engine, or other widget or gadget engine the provides host system software for a physically-inspired applet on a desktop.

Although it is possible to provide for tracking a mobile device using the above-described implementation, it is also possible to implement the functions according to the present disclosure as a dynamic link library (DLL), or as a plug-in to other application programs such as an Internet web-browser such as the FOXFIRE web browser, the APPLE SAFARI web browser or the MICROSOFT INTERNET EXPLORER web browser.

The navigation module 621 may determine an absolute or relative position of the device, such as by using the Global Positioning System (GPS) signals, the GLObal NAvigation Satellite System (GLONASS), the Galileo positioning system, the Beidou Satellite Navigation and Positioning System, an inertial navigation system, a dead reckoning system, or by accessing address, internet protocol (IP) address, or location information in a database. The navigation module 621 may also be used to measure angular displacement, orientation, or velocity of the device 500, such as by using one or more accelerometers.

Figure 7:
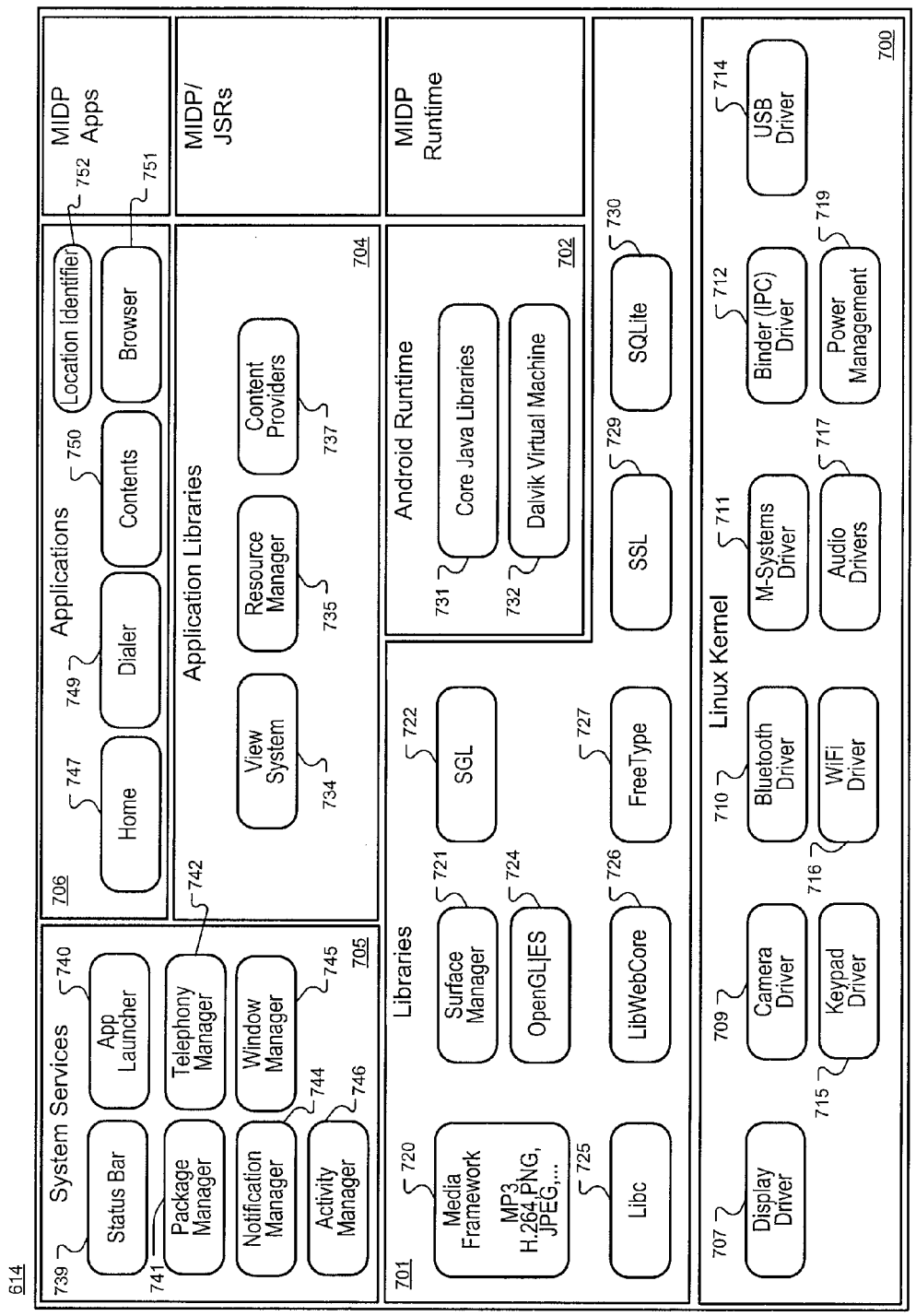
FIG. 7 is a block diagram illustrating exemplary components of the operating system used by the device of FIG. 6.

FIG. 7 is a block diagram illustrating exemplary components of the operating system 713 used by the device 700, in the case where the operating system 713 is a mobile device platform. The operating system 713 invokes multiple processes, while ensuring that the associated phone application is responsive, and that wayward applications do not cause a fault (or "crash") of the operating system. Using task switching, the operating system 713 allows for the switching of applications while on a telephone call, without losing the state of each associated application. The operating system 713 may use an application framework to encourage reuse of components, and provide a scalable user experience by combining pointing device and keyboard inputs and by allowing for pivoting. Thus, the operating system can provide a rich graphics system and media experience, while using an advanced, standards-based web browser.

The operating system 713 can generally be organized into six components: a kernel 700, libraries 701, an operating system runtime 702, application libraries 704, system services 705, and applications 706. The kernel 700 includes a display driver 707 that allows software such as the operating system 713 and the application programs 715 to interact with the display 301 via the display interface 702, a camera driver 709 that allows the software to interact with the camera 507; a BLUETOOTH driver 710; a M-Systems driver 711; a binder (IPC) driver 712, a USB driver 714 a keypad driver 715 that allows the software to interact with the keyboard 302 via the keyboard interface 704; a WiFi driver 716; audio drivers 717 that allow the software to interact with the microphone 509 and the speaker 510 via the sound interface 709; and a power management component 719 that allows the software to interact with and manage the power source 719.

The BLUETOOTH driver, which in one implementation is based on the BlueZ BLUETOOTH stack for LINUX-based operating systems, provides profile support for headsets and hands-free devices, dial-up networking, personal area networking (PAN), or audio streaming (such as by Advance Audio Distribution Profile (A2DP) or Audio/Video Remote Control Profile (AVRCP). The BLUETOOTH driver provides JAVA bindings for scanning, pairing and unpairing, and service queries.

The libraries 701 include a media framework 720 that supports standard video, audio and still-frame formats (such as Moving Picture Experts Group (MPEG)-4, H.264, MPEG-1 Audio Layer-3 (MP3), Advanced Audio Coding (AAC), Adaptive Multi-Rate (AMR), Joint Photographic Experts Group (JPEG), and others) using an efficient JAVA Application Programming Interface (API) layer; a surface manager 721; a simple graphics library (SGL) 722 for two-dimensional application drawing; an Open Graphics Library for Embedded Systems (OpenGL ES) 724 for gaming and three-dimensional rendering; a C standard library (LIBC) 725; a LIBWEBCORE library 726; a FreeType library 727; an SSL 729; and an SQLite library 730.

The operating system runtime 702 includes core JAVA libraries 731, and a Dalvik virtual machine 732. The Dalvik virtual machine 732 is a custom, virtual machine that runs a customized file format (.DEX). The operating system 414 can also include Mobile Information Device Profile (MIDP) components such as the MIDP JAVA Specification Requests (JSRs) components, MIDP runtime, and MIDP applications as shown in FIG. 7. The MIDP components can support MIDP applications running on the device 500. With regard to graphics rendering, a system-wide composer manages surfaces and a frame buffer and handles window transitions, using the OpenGL ES 724 and two-dimensional hardware accelerators for its compositions.

The Dalvik virtual machine 732 may be used with an embedded environment, since it uses runtime memory very efficiently, implements a CPU-optimized bytecode interpreter, and supports multiple virtual machine processes per device. The custom file format (.DEX) is designed for runtime efficiency, using a shared constant pool to reduce memory, read-only structures to improve cross-process sharing, concise, and fixed-width instructions to reduce parse time, thereby allowing installed applications to be translated into the custom file formal at build-time. The associated bytecodes are designed for quick interpretation, since register-based instead of stack-based instructions reduce memory and dispatch overhead, since fixed width instructions simplifies parsing, and since the 16-bit code units minimize reads.

The application libraries 704 include a view system 734, a resource manager 735, and content providers 737. The system services 705 includes a status bar 739; an application launcher 740; a package manager 741 that maintains information for all installed applications; a telephony manager 742 that provides an application level JAVA interface to the telephony subsystem 720; a notification manager 744 that allows all applications access to the status bar and on-screen notifications; a window manager 745 that allows multiple applications with multiple windows to share the display 501; and an activity manager 746 that runs each application in a separate process, manages an application life cycle, and maintains a cross-application history.

The applications 706 include a home application 747, a dialer application 749, a contacts application 750, a browser application 751, and location identifier 752.

The telephony manager 742 provides event notifications (such as phone state, network state, Subscriber Identity Module (SIM) status, or voicemail status), allows access to state information (such as network information, SIM information, or voicemail presence), initiates calls, and queries and controls the call state. The browser application 751 renders web pages in a full, desktop-like manner, including navigation functions. Furthermore, the browser application 551 allows single column, small screen rendering, and provides for the embedding of HTML views into other applications.

Figure 8:
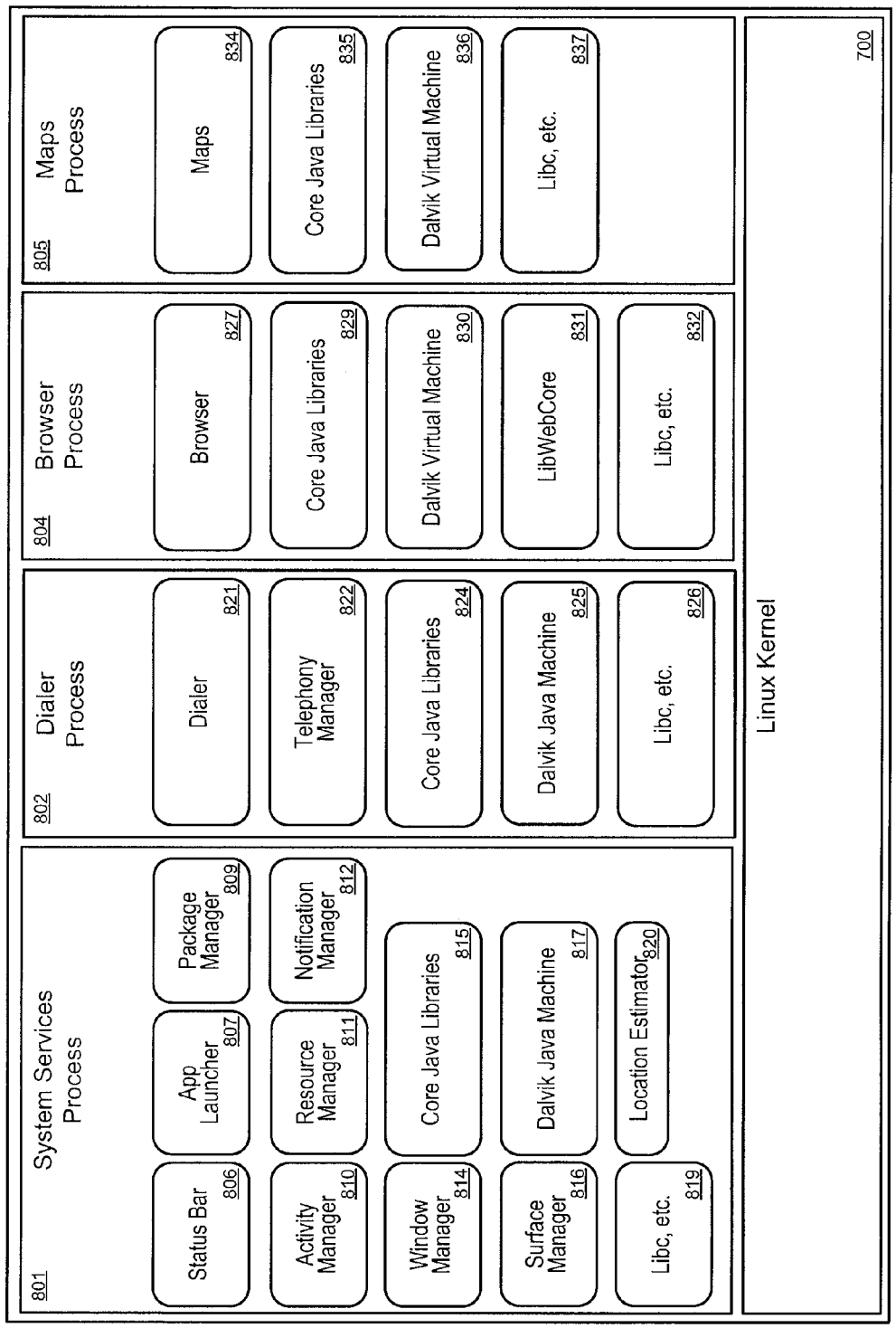
FIG. 8 is a block diagram illustrating exemplary processes implemented by the operating system kernel of FIG. 6.

FIG. 8 is a block diagram illustrating exemplary processes implemented by the operating system kernel 514. Generally, applications and system services run in separate processes, where the activity manager 746 runs each application in a separate process and manages the application life cycle. The applications run in their own processes, although many activities or services can also run in the same process. Processes are started and stopped as needed to run an application's components, and processes may be terminated to reclaim resources. Each application is assigned its own process, whose name is the application's package name, and individual parts of an application can be assigned another process name.

Some processes can be persistent. For example, processes associated with core system components such as the surface manager 816, the window manager 814, or the activity manager 810, can be continuously executed while the device 500 is powered. Additionally, some application-specific process can also be persistent. For example, processes associated with the dialer application 821 may also be persistent. The processes implemented by the operating system kernel 514 may generally be categorized as system services processes 801, dialer processes 802, browser processes 604, and maps processes 805. The system services processes 601 include status bar processes 806 associated with the status bar 739; application launcher processes 807 associated with the application launcher 740; package manager processes 809 associated with the package manager 741; activity manager processes 810 associated with the activity manager 746; resource manager processes 811 associated with a resource manager that provides access to graphics, localized strings, and XML layout descriptions; notification manger processes 812 associated with the notification manager 744; window manager processes 814 associated with the window manager 745; core JAVA libraries processes 815 associated with the core JAVA libraries 731; surface manager processes 816 associated with the surface manager 721; Dalvik virtual machine processes 817 associated with the Dalvik virtual machine 732, LIBC processes 819 associated with the LIBC library 725; and tracking enablement processes 720 associated with the location identifier 752.

The dialer processes 802 include dialer application processes 821 associated with the dialer application 749; telephony manager processes 822 associated with the telephony manager 742; core JAVA libraries processes 824 associated with the core JAVA libraries 731; Dalvik virtual machine processes 825 associated with the Dalvik Virtual machine 732; and LIBC processes 826 associated with the LIBC library 725. The browser processes 804 include browser application processes 827 associated with the browser application 751; core JAVA libraries processes 829 associated with the core JAVA libraries 731; Dalvik virtual machine processes 830 associated with the Dalvik virtual machine 732; LIBWEBCORE processes 831 associated with the LIBWEBCORE library 726; and LIBC processes 832 associated with the LIBC library 825.

The maps processes 805 include maps application processes 834, core JAVA libraries processes 835, Dalvik virtual machine processes 836, and LIBC processes 837. Notably, some processes, such as the Dalvik virtual machine processes, may exist within one or more of the systems services processes 801, the dialer processes 602, the browser processes 804, and the maps processes 805.

Figure 9:
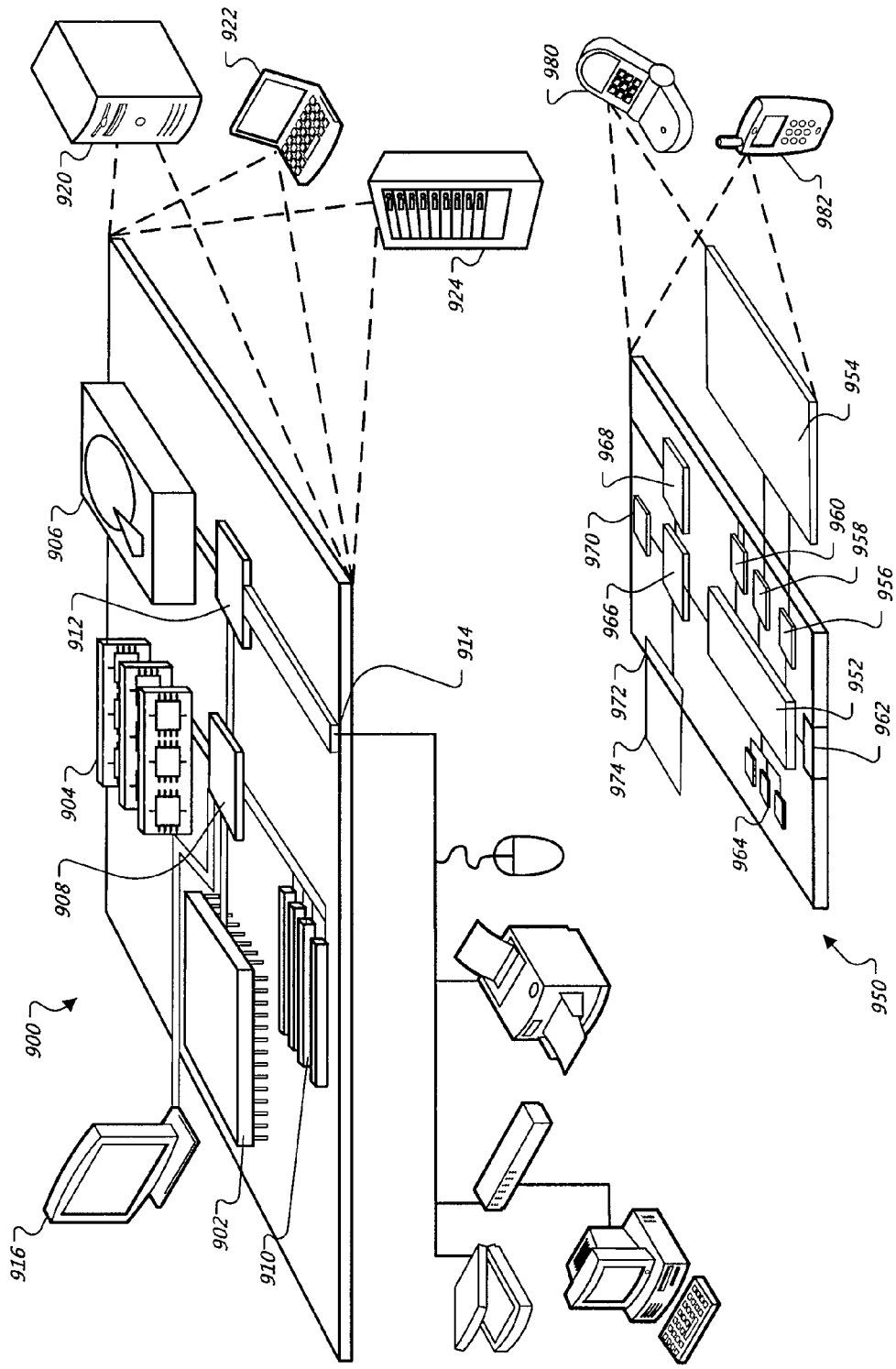
FIG. 9 is an example of a computer device and a mobile computer device that can be used to implement the techniques described here.

FIG. 9 shows an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 700. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, memory on processor 902, or a propagated signal.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 750.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 762 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 750. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, memory on processor 952, or a propagated signal that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smartphone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, the device can be tracked using the methods and systems described to determine the likely locations of the device. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
    receiving, by a location server, a request to identify likely locations of a possessor of a mobile electronic device;
    determining, by the location server and for each of a plurality of possible travel routes, one or more likely locations for the mobile electronic device along the respective possible travel route, based on one or more known past speeds, one or more known past locations of the mobile electronic device, and one or more elapsed times since the past speeds and past locations were known;
    assigning, by the location server, a probability to each of the likely locations along the plurality of possible travel routes;
    adjusting, by the location server and for each of one or more of the likely locations, the probability associated with the likely location based on one or more characteristics associated with the possessor of the mobile device; and
    after adjusting the probability, providing a map of at least some of the likely locations, wherein the map includes one or more curves that connect likely locations with equal probabilities.

2. The method of claim 1, wherein determining, for each of a plurality of possible travel routes, one or more likely locations for the mobile electronic device along the respective possible travel route further comprises:
    determining a geographic area in which the mobile electronic device is likely to be found;
    identifying a plurality of possible travel routes within the geographic area; and
    determining, for each of the plurality of possible travel routes, the one or more likely locations for the mobile electronic device along the respective possible travel route.

3. The method of claim 2, wherein identifying a plurality of possible travel routes comprises identifying a plurality of possible travel routes from a tree model, wherein a root of the tree model comprises a last known location of the mobile electronic device, and branches of the tree model comprise the plurality of possible travel routes in the geographic area.

4. The method of claim 2, wherein the geographic area exhibits a predetermined geometric shape.

5. The method of claim 1, wherein determining one or more likely locations for the mobile electronic device along the respective possible travel route further comprises determining one or more likely locations for the mobile electronic device along the respective possible travel route based on a speed limit of the respective possible travel route.

6. The method of claim 5, wherein determining one or more likely locations for the mobile electronic device along the respective possible travel route further comprises determining one or more likely locations for the mobile electronic device along the respective possible travel route based on a variance of the speed limit of the respective possible travel route.

7. The method of claim 1, wherein the one or more characteristics includes past traffic statistics data.

8. The method of claim 1, wherein the one or more characteristics includes data associated with past travel routines of the possessor of the mobile electronic device.

9. The method of claim 1, wherein the one or more characteristics includes a contact list of the possessor of the mobile electronic device, wherein the contact list comprises location information associated with one or more of the likely locations.

10. The method of claim 1, wherein the one or more known past speeds, the one or more known past locations, and the one or more elapsed times of the mobile electronic device are determined based on at least one of GPS positioning, cellular telephone tower triangulation, WiFi positioning, and peer-to-peer location detection.

11. The method of claim 1, further comprising periodically updating the likely locations to reflect likely movement of the mobile electronic device over time.

12. The method of claim 1, wherein providing a representation of the likely locations further comprises providing map information for displaying zones near a last known location of the mobile electronic device reflecting degrees of likelihood that the device is within each of the zones.

13. A non-transitory computer readable medium having stored thereon instructions, which, when executed by one or more processors, causes the one or more processors to perform operations of:
    receiving a request to identify likely locations of a possessor of a mobile electronic device;
    determining, for each of a plurality of possible travel routes, one or more likely locations for the mobile electronic device along the respective possible travel route, based on one or more known past speeds, one or more known past locations of the mobile electronic device, and one or more elapsed times since the past speeds and past locations were known;

assigning a probability to each of the likely locations along the plurality of possible travel routes;

adjusting, for each of one or more of the likely locations, the probability associated with the likely location based on one or more characteristics associated with the possessor of the mobile device; and after adjusting the probability, providing a map of at least some of the likely locations, wherein the map includes one or more curves that connect likely locations with equal probabilities.

14. The computer readable medium of claim 13, wherein determining, for each of a plurality of possible travel routes, one or more likely locations for the mobile electronic device along the respective possible travel route further comprises determining one or more likely locations for the mobile electronic device along the respective possible travel route based on a speed limit of the respective possible travel route.

15. The computer readable medium of claim 14, wherein determining, for each of the a plurality of possible travel routes, one or more likely locations for the mobile electronic device along the respective possible travel route further comprises determining one or more likely locations for the mobile electronic device along the respective possible travel route based on a variance of the speed limit of the respective possible travel route.

16. The computer readable medium of claim 13, wherein providing a representation of the likely locations further comprises providing map information for displaying zones near a last known location of the mobile electronic device reflecting degrees of likelihood that the device is within each of the zones.

17. The computer-readable medium of claim 13, wherein the one or more characteristics includes one or more of past traffic statistics data, data associated with past travel routines of the possessor of the mobile electronic device, or a contact list of the possessor of the mobile electronic device, wherein the contact list comprises location information associated with one or more of the likely locations.

18. A system comprising:
one or more processors; and
a non-transitory computer readable medium coupled to the one or more processors having instructions stored thereon which, when executed by the one or more processors, cause the one or more processors to perform operations comprising:

receiving a request to identify likely locations of a possessor of a mobile electronic device;

determining, for each of a plurality of possible travel routes, one or more likely locations for the mobile electronic device along the respective possible travel routes, based on one or more known past speeds, one or more known past locations of the mobile electronic device, and one or more elapsed times since the past speeds and past locations were known;

assigning a probability to each of the likely locations along the plurality of possible travel routes;

adjusting, for each of one or more of the likely locations, the probability associated with the likely location based on one or more characteristics associated with the possessor of the mobile device; and after adjusting the probability, providing a map of at least some of the likely locations, wherein the map includes one or more curves that connect likely locations with equal probabilities.

19. The system of claim 18, wherein determining, for each of a plurality of possible travel routes, one or more likely locations for the mobile electronic device along the respective possible travel route further comprises determining one or more likely locations for the mobile electronic device along the respective possible travel route based on a speed limit of the respective possible travel route.

20. The system of claim 19, wherein determining, for each of a plurality of possible travel routes, one or more likely locations for the mobile electronic device along the respective possible travel route further comprises determining one or more likely locations for the mobile electronic device along the respective possible travel route based on a variance of the speed limit of the respective possible travel route.

21. The system of claim 18, wherein providing a representation of the likely locations further comprises providing map information for displaying zones near a last known location of the mobile electronic device reflecting degrees of likelihood that the device is within each of the zones.

22. The system of claim 18, wherein the one or more characteristics includes one or more of past traffic statistics data, data associated with past travel routines of the possessor of the mobile electronic device, or a contact list of the possessor of the mobile electronic device, wherein the contact list comprises location information associated with one or more of the likely locations.

* * * * *

UNITED STATES PATENT AND TRADEMARK OFFICE
CERTIFICATE OF CORRECTION

PATENT NO. : 8,560,236 B1
APPLICATION NO. : 12/143514
DATED : October 15, 2013
INVENTOR(S) : Asif Zahir It is certified that error appears in the above-identified patent and that said Letters Patent is hereby corrected as shown below:

In the Claims:

Column 25, line 22, Claim 15, after "each of", please delete "the".

Signed and Sealed this
Eleventh Day of February, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,560,236 B1 | Page 1 of 1 |
| APPLICATION NO. | : 12/143514 | |
| DATED | : October 15, 2013 | |
| INVENTOR(S) | : Zahir et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1279 days.

Signed and Sealed this
Tenth Day of March, 2015

Michelle K. Lee
*Deputy Director of the United States Patent and Trademark Office*